United States Patent
Powilleit

(10) Patent No.: US 9,058,526 B2
(45) Date of Patent: Jun. 16, 2015

(54) DATA COLLECTION MODULE AND SYSTEM

(75) Inventor: Sven Powilleit, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 387 days.

(21) Appl. No.: 12/704,125

(22) Filed: Feb. 11, 2010
(Under 37 CFR 1.47)

(65) Prior Publication Data

US 2011/0192905 A1  Aug. 11, 2011

(51) Int. Cl.
*G06K 7/10* (2006.01)
*G06F 1/16* (2006.01)

(52) U.S. Cl.
CPC . *G06K 7/10* (2013.01); *G06F 1/163* (2013.01)

(58) Field of Classification Search
USPC ................. 235/454, 462.42, 472.01
See application file for complete search history.

(56) References Cited

U.S. PATENT DOCUMENTS

| | | | |
|---|---|---|---|
| 4,766,299 A | 8/1988 | Tierney et al. | |
| 5,305,181 A | 4/1994 | Schultz | |
| 5,610,386 A | 3/1997 | Ball et al. | |
| 5,928,292 A | 7/1999 | Miller | |
| 6,003,775 A | 12/1999 | Ackley | |
| 6,149,062 A | 11/2000 | Danielson et al. | |
| 6,811,088 B2 * | 11/2004 | Lanzaro et al. | 235/462.46 |
| 6,853,293 B2 | 2/2005 | Swartz et al. | |
| 7,140,546 B1 | 11/2006 | Terlizzi et al. | |
| D554,641 S | 11/2007 | Miller et al. | |
| 2002/0000470 A1 | 1/2002 | Lanzaro et al. | |
| 2005/0087603 A1 | 4/2005 | Koenck et al. | |
| 2006/0023070 A1 | 2/2006 | Nakamura et al. | |

FOREIGN PATENT DOCUMENTS

CN  201689432 U  12/2010

OTHER PUBLICATIONS

Data Sheet, Motorola USA, "RS507 Hands-Free Corded/Cordless Imager", found at "http://www.motorola.com/Business/US-EN/Business+Product+and+ . . . " printed on Sep. 29, 2009, pp. 1-2.
Data Sheet, Motorola USA, "RS409 Wearable Ring Scanner", found at "http://www.motorola.com/business/v/index.jsp?vgnextoid=5dbee90e3ae95110VgnVCM100 . . . ", printed on Mar. 6, 2008, p. 1.
Data Sheet, Motorola USA, "RS309 Wearable Scanner", found at "http://www.motorola.com/business/v/index.jsp?vgnextoid=e84ee90e3ae95110VgnVCM100 . . . ", printed on Mar. 6, 2008, p. 1.
Data Sheet, Motorola USA, "WT4000 Wearable Terminal", found at "http://www.motorola.com/business/v/index.jsp?vgnextoid=1ce1e90e3ae95110VgnVCM100 . . . " printed on Mar. 6, 2008, p. 1.
Data Sheet, Dell Products, "Cordless Ring Scanner 9M", found at http://accessories.us.dell.com/sna/productdetail.aspx?sku=A1186363&cd=19&c=us&l=en& . . . , printed on Mar. 6, 2008, pp. 1-2.

(Continued)

*Primary Examiner* — Rafferty Kelly
(74) *Attorney, Agent, or Firm* — Additon, Higgins & Pendleton, P.A.

(57) ABSTRACT

A data collection module including an illumination assembly and an imaging assembly, a processor configured to operate the illumination and imaging assemblies, at least one network interface configured to communicate with a terminal module, at least one power supply and a terminal module interface configured to communicate with a terminal module when the data collection module is mated with the terminal module.

20 Claims, 4 Drawing Sheets

(56) References Cited

OTHER PUBLICATIONS

Data Sheet, Zypad, "ZRS-1D: Zypad Ring Scanner 1D barcodes", found at http://www.zypad.com/zypad/wearablecomputers.aspx?pg=Zypad%2OWL%201000%20Rin . . . , printed on Mar. 6, 2008, p. 1.

Data Sheet, LXE, "8650 Series, Bluetooth Ring Scanner", LXE, 125 Technology Parkway, NOrcross, GA 30092 (800) 664-4593; www.lxe.com; pp. 1-2.

Data Sheet, Socket, "Bluetooth Cordless Ring Scanner, Series 9, Hands-Free Data Collection for the Mobile Workforce", Socket, Sales Offices and Corporate Headquarters, 39700 Eureka Dr., Newark, CA 94560, Web: socketmobile.com, Phone: (800) 552-3300, pp. 1-5.

Chinese Office Action with Search Report, CN Patent Application No. 201110068255.8. Dated Jul. 3, 2014, 24 pages.

Jun. 28, 2012 Office Action in European Application No. 11154131.4.

May 31, 2013 Office Action in European Application No. 11154131.4.

Second Office Action in Chinese Application 201110068255.8, English Translation provided, 46 pages, Date of Issue Feb. 16, 2015. [References previously cited.].

* cited by examiner

DATA COLLECTION MODULE AND SYSTEM

TECHNICAL FIELD

The present invention relates to portable data terminals and more particularly, to a highly portable, multi-interface and hands-free data terminal having a data collection module.

BACKGROUND INFORMATION

Portable data terminals such as optical and laser indicia readers, barcode scanners, and other mobile computers, for example, typically read data represented by printed indicia such as symbols, symbology, and bar codes, for example. One type of symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light. One-dimensional (1D) optical bar code readers are characterized by reading data that is encoded along a single axis, in the widths of bars and spaces, so that such symbols can be read from a single scan along that axis, provided that the symbol is imaged with sufficiently high resolution.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures.

Many other classes of bar code symbologies and/or indicia have been known and are in widespread use including, for example, PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, OCR-A, OCR-B, Code 11, UPC, EAN, MSI, and Code 16K. Further, indicia may be represented by printed indicia, symbol indicia, biogenic/biometric indicia or any information extracted from a captured image.

Conventionally, a reader, whether portable or otherwise, includes a central processor which directly controls the operations of the various electrical components housed within the bar code reader. For example, the central processor controls detection of keypad entries, display features, wireless network communication functions, trigger detection, and bar code read and decode functionality. More specifically, the central processor typically communicates with an illumination assembly configured to illuminate a target, such as a bar code, and an imaging assembly configured to receive an image of the target and generate an electric output signal indicative of the data optically encoded therein.

In one exemplary and typical application, portable data terminals are used in warehousing and delivery environments to scan packages being loaded on a delivery vehicle and upon delivery to scan packages at their destination as well as receive a recipient's signature, lookup addresses, enter delivery codes, among other functions largely unique to the delivery portion of the operation. Upon loading the delivery vehicle, it is advantageous that a user/driver/delivery person be able to both scan packages rapidly and have full use of both hands in order to move packages around and on to a delivery vehicle as quickly as possible. Accordingly, hands-free portable data terminals have been designed and are commercially available such as the RS309 Wearable Scanner, RS409 Wearable Ring Scanner, RS507 Hands-Free Corded/Cordless Imager, and WT2000 Wearable Terminal by Motorola®, 9M Cordless Ring Scanner by Socket®, ZRS-1D Ring Scanner by Zypad, and 8650 Series Bluetooth™ Ring Scanner by LXE®. Similar designs are disclosed by U.S. Pat. Nos. 5,610,386, 6,811,088, D554,641, 6,853,293, and 6,853,293, each of which is incorporated herein by reference. However, these devices all require corded or wireless connection to a terminal or data recording device typically worn on the wrist/arm but generally located somewhere on the person. These devices provide an appropriate interface for the loading operation in the example above but do not provide an ideal interface in terms of screen size and keyboard usability/access required for the delivery portion of the operation. For example, to use the devices identified above to obtain a signature and also scan the delivered package requires that (1) the recipient sign the terminal located on the user's person (2) the user remove the terminal from his person for the recipient to sign and/or (3) the user constantly wear the scanner module or put it on upon delivery of a package and take it off after the package is scanned. None of these scenarios are ideal and, further, if the scanner module is being removed, particularly in the case of a cordless device, it is likely that the scanner module will become separated from the terminal. Alternatively, if the scanner module is constantly worn, it is difficult and cumbersome for the user to interact with the terminal including the keypad to, for example, look up addresses or enter delivery codes.

Accordingly, there is a need for a multi-interface portable data terminal system that includes a multiple unit hands-free interface as well as an integrated unit, highly accessible and user-friendly interface.

BRIEF DESCRIPTION OF THE DRAWINGS

The present invention is disclosed with reference to the accompanying drawings, wherein.

Figures 1A, 1B:
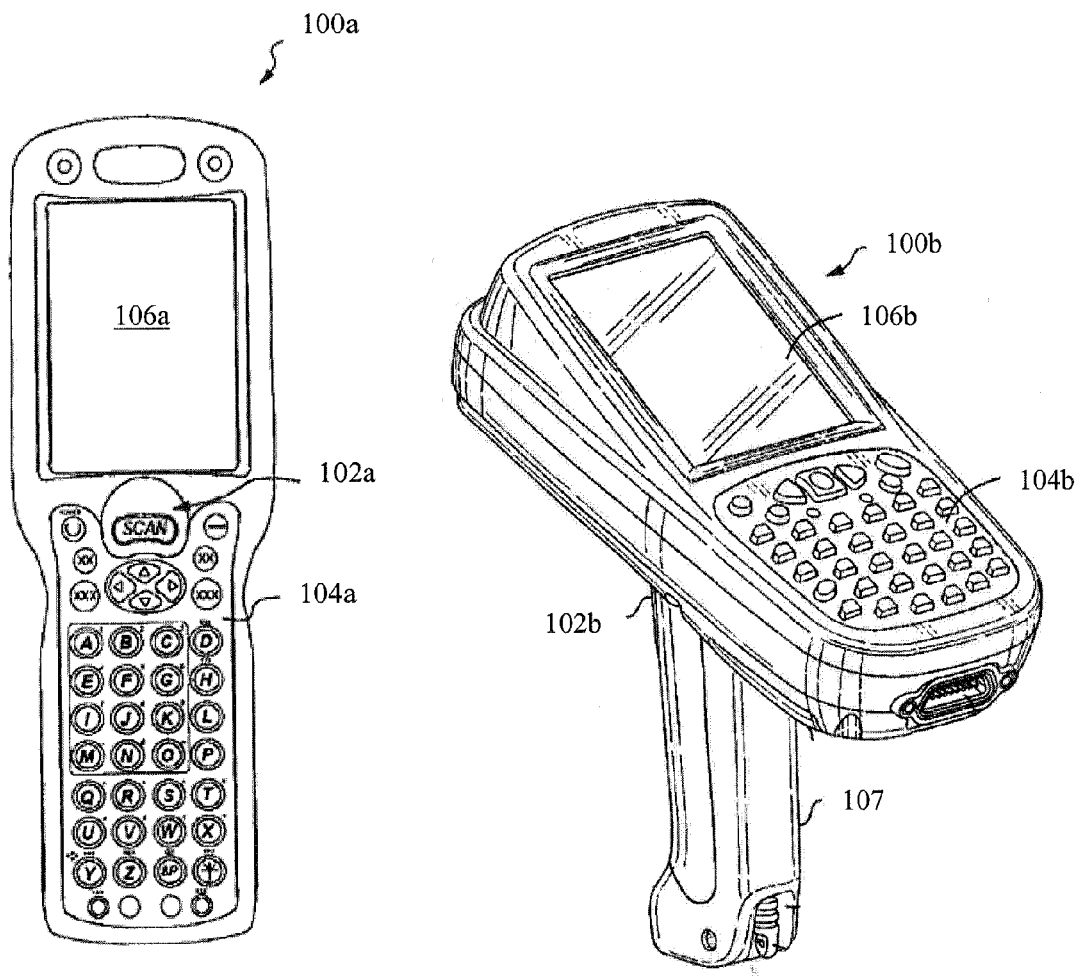
FIG. 1 is a plan view and a side perspective view of two prior art PDTs.

It will be appreciated that for purposes of clarity and where deemed appropriate, reference numerals have been repeated in the figures to indicate corresponding features.

DETAILED DESCRIPTION

Referring to FIGS. 1A and 1B, two exemplary PDTs 100 for reading/scanning printed indicia are shown. Although the present invention is described with respect to a PDT, the invention can be utilized in any bar code scanner, mobile device, mobile computer, or personal data assistant, for example. The PDT housing can be shaped so as to fit into a human hand using a handle portion 104 and can include a user interface device such as a finger actuatable scan/capture or trigger button 101 as well as a keypad 102 for inputting data and commands, power button, and antenna for facilitating communication with a local or remote host processor, for example. The PDT also includes a display 106, such as an LCD or OLED display, for example, for displaying information to the user. If the display 103 is a touch screen, a stylus (not shown) may also be included to facilitate interaction with the touch screen. An aperture in the housing is included such that illumination and imaging optics have substantially unobstructed access to a target. The PDT can also include a power port for receiving a power supply as well as one or more communication ports for facilitating wired or wireless communication with a network interface. Although the PDTs shown in FIG. 1 provide a suitable interface for user interaction with the keyboard and/or display, these devices do not provide an adequate interface for hands-free scanning as is required in many scan-intensive PDT applications in which the user is interacting with the device primarily or solely for the purpose of reading printed indicia.

Figure 2:
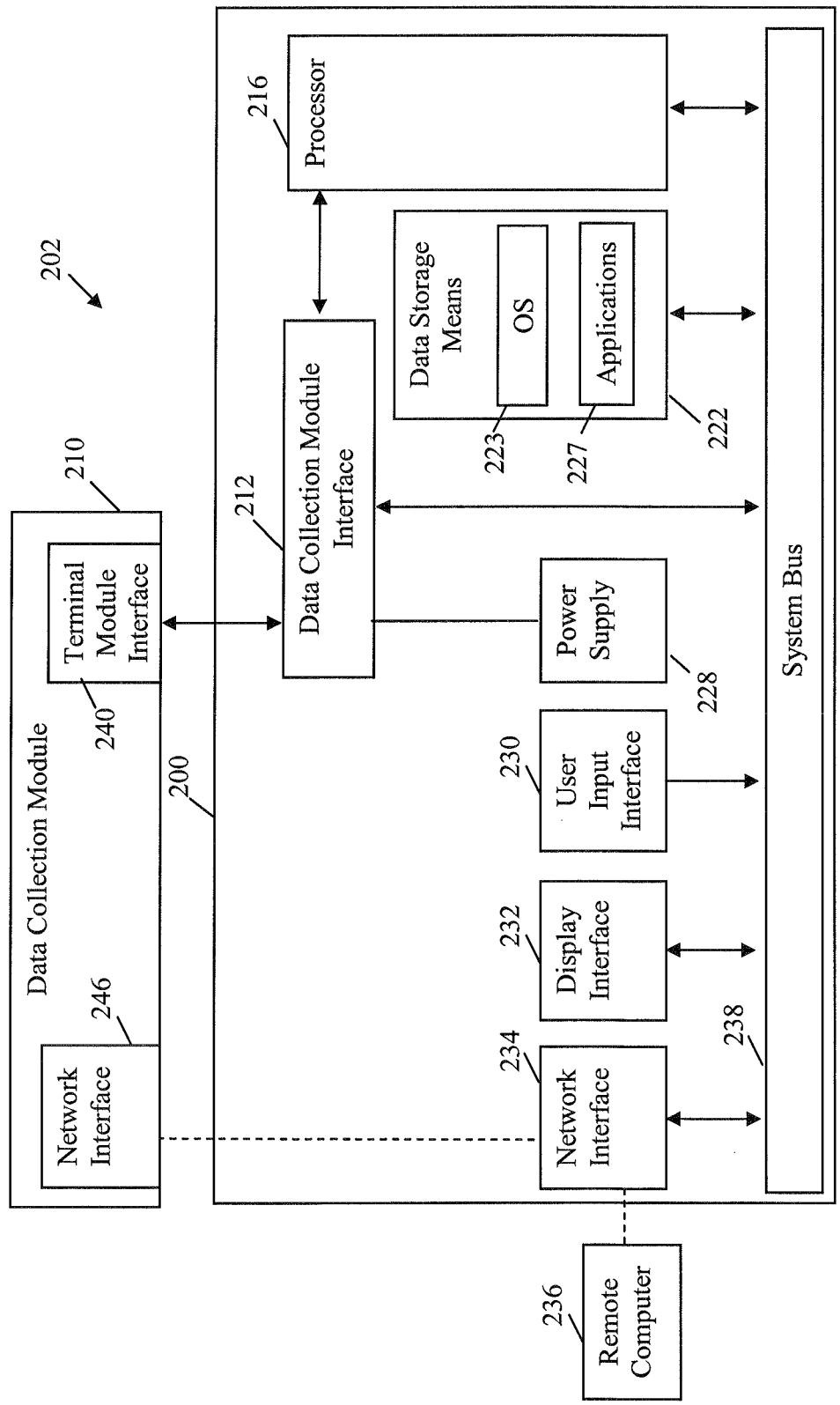
FIG. 2 is a block schematic diagram of an exemplary PDT according to the present invention.

Accordingly, referring to FIG. 2, there is shown a block schematic diagram of the basic structures that together comprise a PDT 202 according to the present invention. The PDT 202 includes a terminal module 200 and a data collection module 210 further described below with respect to FIGS. 3-6. The terminal module 200 includes one or more programmable control means such as a processor 216 and/or a microprocessor such as a VLSI integrated circuit microprocessor. The processor 216 controls the operation of the terminal module 200 and, optionally, one or more system components of the data collection module 210, in accordance with operating system 223 and application 227 program instructions stored in a data storage means 222 such as a local, network-accessible, removable and/or non-removable memory, such as RAM, ROM, and/or flash, for example. Exemplary application 227 program instructions are an analog to digital converter, a 1D decoder, and a 2D decoder that, when implemented by the processor 216, operate to decode any bar code contained in an image as is known in the art. The processor 216 communicates using a system bus 238 to various system components such as a display interface 232 configured to communicate with a display such as an LCD or an OLED display, a user input interface 230 configured to communicate with a keyboard, keypad, touch screen and/or scan/trigger button, for example, and a network interface 234 such as an RS-232, RS-485, USB, Ethernet, Wi-Fi, Bluetooth™, IrDA or Zigbee interface configured to communicate with a remote computer 236 and/or the data collection module 210. The terminal module 200 further includes a power supply 228, such as a 12V supply, battery and/or rechargeable battery, for example, which supplies current to the terminal module 200 and, in one embodiment, the data collection module 210 when the data collection module 210 is mated with the terminal module 200 as discussed further below. The terminal module 200 further includes a data collection module interface 212 configured to communicate with the data collection module 210 when the data collection module 210 is received by the terminal module 200.

Figure 3:
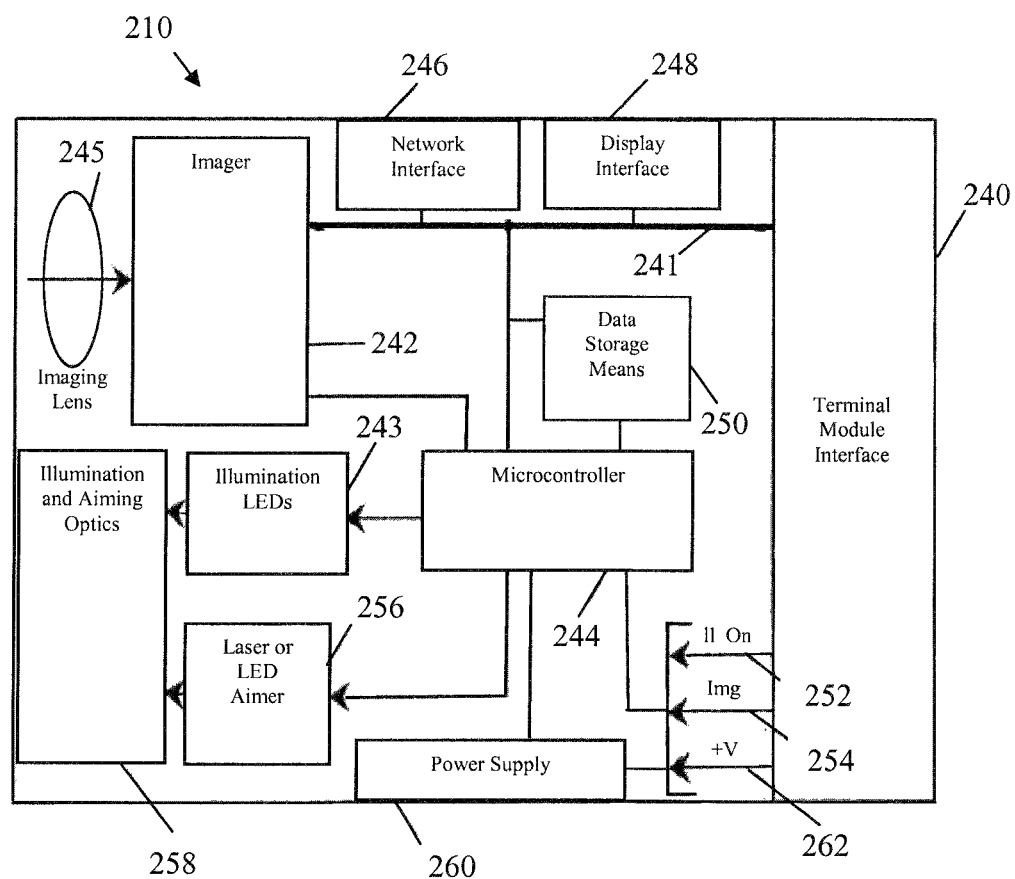
FIG. 3 is a block schematic diagram of an exemplary data collection module according to the present invention.

The PDT 202 further includes a data collection module 210 as more clearly described with reference to FIG. 3 as including a processor 244 such as a microcontroller, ASIC, or VLSI processor for example, which controls the operation of the data collection module 210 by implementing program instructions retrieved from the data storage means 222 or, optionally, from data storage means 250 disposed on the data collection module 210. The data collection module 210 further includes an imaging assembly including imaging optics such as an imaging lens 245 and an image sensor 242 such as a 2D image sensor such as a CCD, CMOS, NMOS, PMOS, CID, of CMD solid state image sensor, for example. The data collection module 210 also includes an illumination assembly including illumination optics 258 such as a lens plate and at least one light source 243 such as one or more LEDs configured to emit light in the near-infrared range and/or the visible range, green LED(s), and/or a laser diode, as well as an optional aimer assembly 256. Accordingly, the light source 243 directs light through illumination optics 258 in the direction of a target, such as a bar code, for example. The emitted light is then reflected by the target through the imaging lens 245 onto the image sensor 242 such as a 2D image sensor configured to receive an image of the target and generate an electric output signal indicative of the data optically encoded therein. Output signal(s) transmitted by the image sensor 242 are then sent using a bus 241, for example, to a terminal module interface 240 and/or a network interface 246 or to another system component such as data storage means 250. The network interface 246 can be a an RS-232, RS-485, USB, Ethernet, Wi-Fi, Bluetooth™, IrDA or Zigbee interface, for example. The data collection module further includes a power supply 260, preferably including at least one rechargeable battery and an optional display interface 248 configured to communicate barcode decode success to the user such as by indicator light or audible sound, for example. In another embodiment, no display interface is provided in the data collection module and/or the terminal module 200 is configured to indicate read/decode success. An optional user input interface (not shown) can be included to receive a signal from a scan/trigger button (not shown) should the data collection module 210 not be operated in a continuous scan mode. The terminal module 200 and data collection module 210 structures shown in FIGS. 2 and 3 are preferably supported on one or more printed circuit boards (not shown).

Figure 4:
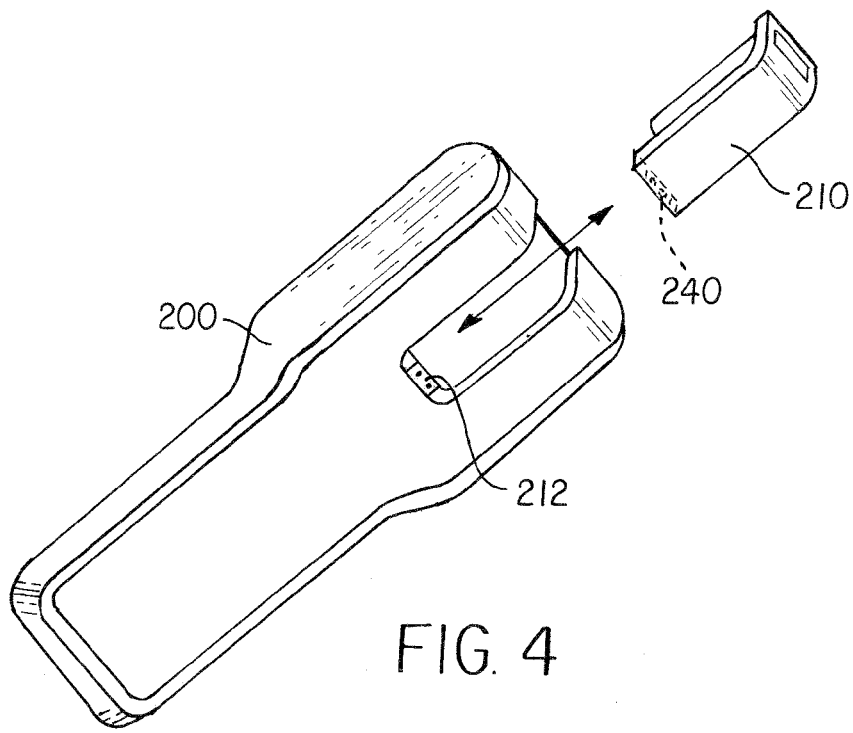
FIG. 4 is a perspective view of a PDT and data collection module according to the present invention.

Although many physical configurations are possible within the scope of the invention, in one embodiment shown FIG. 4, the housing of the terminal module 200 is configured to mate with the data collection module 210 preferably such that electrical connection between terminal module interface 240 and data collection module interface 212 is maintained should the PDT 200 be flipped, rotated, dropped, or otherwise handled in the regular course of operation. Accordingly, the connection can include sliding contacts or other electrical connections and a locking mechanism is optionally included to maintain interaction between the data collection module 210 and the terminal module 200. The terminal module 200 can also include an option strap or clip configured to fix the terminal module, while the user is scanning with the data collection module 210, such as by clipping to a belt, for example.

Figure 5:
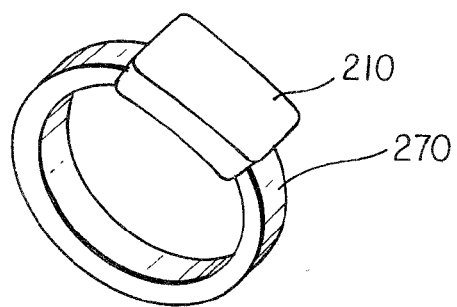
FIG. 5 is a perspective view of a ring-mounted data collection module according to the present invention.
Figure 6:
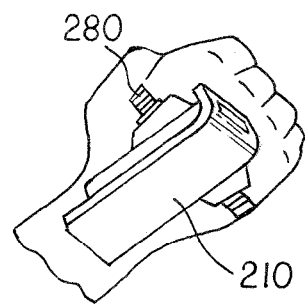
FIG. 6 is a perspective view showing a hand-mounted data collection module according to the present invention.

Referring to FIGS. 5 and 6, the data collection module 210 can include means for attaching the data collection module 210 to one of a hand strap 280, a ring 270, and an article of clothing such as a shirt pocket or a belt, for example. In the embodiments shown in FIGS. 5 and 6, an optional user interface device such as a scan/trigger button (not shown) can be included such as on the side of the data collection module 210 in the embodiment shown in FIG. 5 or on the portion of the data collection module 210 adjacent the wrist or back of the hand in the embodiment shown in FIG. 6.

In one exemplary embodiment, a user operates the PDT 200 by clipping the terminal module 200 to an article of clothing and strapping the data collection module 210 to one hand, for example. The user then interacts with the data collection module 210 so as to begin an image capture of a target barcode (if not already begun such as by a continuous scan mode initiated upon removal from the terminal module 200) interacting with a scan/capture button (not shown) on the data collection module 210. The image capture event is communicated across bus 241 to processor 244 which then implements program instructions stored in data storage means 250 so as to control the illumination and imaging assemblies in order to collect and transmit pixel data representing an image of the target from the image sensor 242. In one embodiment, the pixel data is then communicated across bus 241 to data storage means 250 where it is stored as a frame buffer. The processor 244 then accesses the frame buffer and, implementing 1D and/or 2D decode instructions, for example, stored in the data storage means 250, decodes any bar code contained in the image. In one embodiment, the processor 244 communicates the decode success (or failure) event to the display interface 248 across bus 241 and the display interface 248 communicates the decode event to the user in the form of an LED light or an audible signal for example and as discussed above. Assuming a successful decode, the decoded barcode data is then communicated across bus 241 to network interface 246 where it is wirelessly sent to the network interface 234 of the terminal module 200 and communicated to a remote computer 236 and/or communicated across system bus 238 to data storage means 222 for later processing, for example. Alternatively, the decoded barcode data is maintained in the data collection module data storage means 250 and transmitted across bus 241 to terminal module interface 240 and to data collection module interface 212 upon physical mating of the data collection module 210 with the terminal module 200.

Upon completion of the operation, the user can then place the data capture module 210 in the housing of the terminal module 200 where its terminal module interface 240 is connected to a data collection module interface 212 of the terminal module 200 whereby electrical connection of the interfaces 240 and 212 is established by one or more electrical connectors or pins. While mated with the data collection module 212, the terminal module 200 distributes power 262 from power supply 238 across data collection module interface 212 to terminal module interface 240 and power supply 260 in order to recharge the rechargeable batteries of the data collection module 210. In the mated mode of operation, the terminal module 200, including processor 216 implementing instructions retrieved from data storage means 222, controls the operation of the data collection module 210 and, specifically, controls the imaging and illumination assemblies, by sending control signals 252, 254 to the terminal module interface 240 through the data collection module interface 212. In this embodiment, user interaction with a user interface device such as a scan button, capture button, trigger, keypad, keyboard, or touch screen, for example, of the terminal module 200 causes processor 216 to implement program instructions stored in data storage means 222 and communicated over data collection module interface 212 and terminal module interface 240 to control the imaging and illumination assemblies of the data collection module. Accordingly, the image pixel data transmitted by the image sensor 242 can be communicated across bus 241 to the terminal module interface 240 where it is transferred to the data collection module interface and stored as a frame buffer in data storage means 222. Accordingly, in this embodiment, the network interface 246 is not utilized to transmit pixel data or barcode decode data but rather, pixel data is received from the data collection interface and the processor 216 implements program instructions retrieved from data storage means such as applications 227 in order to decode any barcode contained in the image. Further, a decode event can be communicated to display interface 232 of the terminal module 200 which can communicate the decode success (or failure) to the user through a display of the terminal module 200. In another embodiment, the barcode decode sequence is initiated by user interaction with a user interface device of the terminal module 200 but otherwise proceeds utilizing the system components of the data collection module 210. Other combinations of operating the processors 216, 244 and data storage means 222, 241, and power supplies 228, 260 are also contemplated.

According to the invention, when the data collection module 210 is separated from the terminal module 200, the user enjoys hands-free scanning operation. Further, when the data collection module 210 is mated with the terminal module 200, the user enjoys the size of and access to the keypad and display while still maintaining the ability to scan a barcode or other indicia as required.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A data collection module, comprising:
an illumination assembly and an imaging assembly;
a processor configured to operate the illumination and imaging assemblies;
at least one network interface configured to communicate with a terminal module;
at least one power supply;
a terminal module interface configured to communicate with a terminal module when the data collection module is mated with the terminal module;
wherein the data collection module is configured so that when the data collection module is not mated to the terminal module, the data collection module is operative so that the processor implements decode instructions to decode pixel data from the imaging assembly, and wherein the data collection module is further configured so that when the data collection module is mated to the terminal module, the data collection module is operative to transmit pixel data from the imaging assembly to the terminal module for decoding by a processor of the terminal module.

2. The data collection module of claim 1 wherein the at least one power supply includes at least one rechargeable battery and wherein the terminal module is configured to recharge the battery by communicating with the data collection module to provide power over the terminal module interface when the data collection module is mated with the terminal module.

3. The data collection module of claim 1 wherein the imaging assembly further includes imaging optics and an image sensor and the illumination assembly further includes illumination optics and at least one light source wherein the image sensor selected from the group consisting of a CCD, CMOS, NMOS, PMOS, CID, and CMD.

4. The data collection module of claim 1 further including at least one bus in communication with at least the processor, network interface, and terminal module interface.

5. The data collection module of claim 1 wherein the network interface is selected from the group consisting of RS-232, RS-485, USB, Ethernet, Wi-Fi, Bluetooth™, IrDA and Zigbee interfaces.

6. The data collection module of claim 1 further including at least one data storage means configured to store both image pixel data received from the imaging assembly and program instructions that when implemented by the processor are configured to control the illumination and imaging assemblies.

7. The data collection module of claim 1 wherein the terminal module interface is configured to receive program instructions for operating the data collection module from a terminal module when the data collection module is mated with the terminal module.

8. The data collection module of claim 1 wherein the terminal module interface is configured to communicate image pixel data to a terminal module when the data collection module is mated with the terminal module.

9. The data collection module of claim 1 wherein the terminal module interface is configured to communicate bar code decode data to a PDT when the data collection module is mated with the PDT.

10. The data collection module of claim 1 further including a use input interface configured to communicate with at least one scan/trigger button.

11. The data collection module of claim 1 further including means for attaching the data collection module to one of a hand strap, a ring, and an article of clothing.

12. A terminal module, comprising:
a housing having disposed therein a processor, data storage means, a network interface, a display interface, a use input interface, a power supply, a system bus and a data collection module interface; and
wherein the housing is configured to receive a data collection module and the terminal module is configured to communicate with the data collection module through the data collection module interface when the data collection module is received by the housing;
a terminal module interface configured to communicate with a terminal module when the data collection module is mated with the terminal module;
wherein the terminal module is configured so that when the data collection module is not mated to the terminal module, the terminal module is operative to receive decoded bar code data from the data collection module through the network communication interface, and wherein the terminal module is further configured so that when the data collection module is mated to the terminal module, the terminal module does not receive decoded bar code data from the data collection module through the network communication interface and is operative to receive pixel data from the data collection module through the terminal module interface and decode a barcode contained in the pixel data received through the terminal module interface.

13. The terminal module of claim 12 wherein the network interface is selected from the group consisting of RS-232, RS-485, USB, Ethernet, Wi-Fi, Bluetooth, IrDA and Zigbee interfaces.

14. The terminal module of claim 12 wherein the terminal module is further configured to communicate with the data collection module by implementing program instructions for operating the data collection module using one of the network interface or the data collection module interface when the data collection module is mated with the terminal module.

15. A PDT, comprising:
a data collection module including an illumination assembly, an imaging assembly, a processor, at least one network interface, at least one power supply and a terminal module interface;
a terminal module including a terminal housing having disposed therein a processor, data storage means, a network interface, a display interface, a user input interface, at least one power supply, a system bus and a data collection module interface; and
wherein the terminal housing is configured to mate with the data collection module and the terminal module is configured to communicate with the data collection module through the data collection module interface when the data collection module is mated with the terminal housing;
wherein the PDT includes a mated mode of operation characterized by one or more of (a) the illumination assembly and the imaging assembly is controlled responsively to a user interaction with a user interface device of the terminal module, and (b) the terminal module is operative to receive pixel data from the imaging assembly of the data collection module through the terminal module interface and decode a bar code contained in the pixel data.

16. The PDT of claim 15 wherein the at least one data collection module power supply includes at least one rechargeable battery and wherein the terminal module is configured to recharge the battery when the data collection module is mated with the terminal housing.

17. The PDT of claim 15 wherein the imaging assembly further includes imaging optics and an image sensor and the illumination assembly further includes illumination optics and at least one light source wherein the image sensor is selected from the group consisting of a CCD, CMOS, NMOS, PMOS, CID, and CMD.

18. The PDT of claim 15 wherein the data collection module network interface and further the terminal module network interface are selected from the group consisting of RS-232, RS-485, USB, Ethernet, Wi-Fi, Bluetooth, IrDA and Zigbee interfaces.

19. The PDT of claim 15 wherein the data collection module further includes data storage means and wherein at least one of the data collection module storage means and the terminal module storage means is configured to store program instructions that when implemented by a processor are configured to control the illumination and imaging assemblies.

20. The PDT of claim 15 wherein the mated mode of operation is further characterized by the terminal module being operative to receive pixel data from the imaging assembly of the data collection module through the terminal module interface and to decode a bar code contained in the pixel data.

* * * * *